Patented July 14, 1925.

UNITED STATES PATENT OFFICE.

1,546,309

JEAN PAISSEAU, OF PARIS, FRANCE.

METHOD OF MANUFACTURE OF ARTIFICIAL PEARLS AND MOTHER-OF-PEARL.

No Drawing.   Application filed January 6, 1925.   Serial No. 917.

*To all whom it may concern:*

Be it known that I, JEAN PAISSEAU, a citizen of the Republic of France, residing at Paris, in the Seine Department, Republic of France, have invented certain new and useful Improvements in the Methods of Manufacture of Artificial Pearls and Mother-of-Pearl; and I declare the following to be a full, clear, and exact description of the invention, such as will enable others skilled in the art to which it appertains to make and use the same.

In order to imitate pearls or mother of pearl, the known process employ what is termed pearl essence, this consisting as is well known of the brilliant particles of fish scales. These are agglutinated with plastic substances, for instance with cellulose compounds. But owing to the great cost of the pearl essence thus produced, the manufacture of artificial pearl objects has been much restricted.

For the above-mentioned purposes attempts have been made to replace the pearl essence by metallic powders (aluminium or silver) or by small plates of powdered mother of pearl or mica. But such powders will not afford the desired pearly appearance, and after the operations of grinding and incorporation into the plastic substances the small plates will no longer have the pearly appearance.

The present invention has for its object a process wherein is effected.

(1) The manufacture of an artificial pearl essence consisting of minute and colourless particles which result from the chemical precipitation of an alkaline earth hyposulphite such as the hyposulphite of barium, calcium or strontium.

(2) In the incorporation of the said pearl essence into suitable plastic substances, for the obtainment of products of a pearly and opalescent nature.

The manufacture of the artificial pearl essence may be carried out for example in the following manner:

Mixtures of soluble hyposulphites and barium salts are precipitated in order to obtain in certain conditions barium hyposulphite in the form of fine and lamellated crystals having the appearance of pearl essence.

The following may be given by way of example: 1 part of barium chloride is dissolved in 5 parts of cold water, and the solution is introduced in small quantities into 5 parts of sodium hyposulphite in an equal quantity of cold water. This will form a troubled and a cloudy solution. To the same are then added 200 parts of water and the whole is heated to the boiling point; the double hyposulphite of sodium and barium will be completely dissolved. The solution is allowed to cool, and the artificial pearl essence (as it is termed) is precipitated. Its formation can be furthered by the addition of alcohol. After the precipitation, the clear liquid is poured off and the crystals are washed in 25 per cent and then in 50 per cent alcohol. The crystals are then placed in strong alcohol, acetone or other solvent which is suitable for the incorporation of the plastic substance, and this latter may be effected as follows.

Inasmuch as barium hyposulphite is almost insoluble in water and in the usual solvents for plastic substances, such as alcohol, ethers, acetone, methyl or amyl acetates, tetrachlorethane and the like, it may be introduced into the following substances:

1. Substances whose base is gelatine, albumin, casein, and for instance galalith;
2. Substances whose base is nitrocellulose, such as celluloid or like substances;
3. Acetate of cellulose or like substances;
4. Bakelite and analogous substances, resins, varnishes, linoleum and the like;
5. Viscose and analogous substances;
6. India rubber, gutta percha and the like.

It is observed that various decorative aspects can be obtained, in the same manner as with pearl essence, either by incorporating into the plastic substance itself, in solution or not, or by operating by superposition between layers of transparent plastic substance, for instance by agglomerating under the press superposed sheets of celluloid covered upon one face with a layer of barium hyposulphite in suspension in acetone. The pearly appearance will be obtained by employing a considerable number of layers.

Since the temperature of decomposition of barium hyposulphite by heat is at least equal to the temperature of decomposition of the brilliant particles of the pearl essence and of plastic substances in general, all the articles may assume the pearly aspect and may be produced by the known processes of pressing, moulding, turning and the like.

Obviously, they may be given iris hues by the known methods.

Claims:

1. Method of manufacture of artificial pearls and mother of pearl, which consists in producing an artificial pearl essence by the chemical precipitation of an alkaline earth hyposulphite and in incorporating the said pearl essence into a plastic substance.

2. Method of manufacture of artificial pearls and mother of pearl, which consists in the incorporation into a plastic substance of an alkaline earth hyposulphite obtained by chemical precipitation.

3. Method of manufacture of artificial pearls and mother of pearl which consists in the incorporation of an alkaline earth hyposulphite into a plastic substance having the nature of cellulose, or into a collodion.

4. Method of manufacture of artificial pearls and mother of pearl which consists in the incorporation of barium hyposulphite into a plastic substance.

5. Method of manufacture of artificial pearls and mother of pearl which consists in introducing a solution of barium chloride into a solution of sodium hyposulfite, in adding alcohol thereto, in allowing the solution to cool, in separating the liquid by decantation from the alcohol precipitate, in adding the said precipitate to an auxiliary liquid, and in incorporating the resulting mixture into a suitable plastic substance, said auxiliary liquid being a solvent for the said plastic substance.

In testimony whereof I have hereunto affixed my signature.

JEAN PAISSEAU.